United States Patent [19]

Adams

[11] Patent Number: 4,620,668
[45] Date of Patent: Nov. 4, 1986

[54] ADAPTIVE CONTROL SYSTEM

[75] Inventor: John T. Adams, Minneapolis, Minn.

[73] Assignee: Honeywell Inc., Minneapolis, Minn.

[21] Appl. No.: 727,315

[22] Filed: Apr. 25, 1985

[51] Int. Cl.⁴ .............................................. F23N 5/20
[52] U.S. Cl. .................................. 236/46 R; 165/12
[58] Field of Search ...................... 236/46 R; 165/12; 364/557, 505, 148

[56] References Cited

U.S. PATENT DOCUMENTS

| | | | |
|---|---|---|---|
| 4,156,502 | 5/1979 | Day | 165/12 X |
| 4,475,685 | 10/1984 | Grimado et al. | 236/46 R |
| 4,522,336 | 6/1985 | Culp | 236/46 R |

*Primary Examiner*—William E. Wayner
*Attorney, Agent, or Firm*—Mitchell J. Halista; Trevor B. Joike

[57] ABSTRACT

An adaptive control system uses a controller for controlling an air temperature treatment apparatus at a reduced energy consuming level during periods of non-occupancy of a building and for energizing the air treatment apparatus before occupancy so that a desired internal building temperature is reached by a time of occupancy. The controller includes a temperature sensor for sensing an environmental temperature within the building, a control timer responsive to the actual time-of-day for initiating the start of a pre-occupancy control cycle for the temperature treatment apparatus at a first predetermined real time, an adjustable timer for defining a second predetermined time following the first time, and logic means for incrementing or decrementing the second predetermined time by an incremental time in response to a comparison of the environmental temperature reached in the building at the end of the sum of the first and second real times with a setpoint temperature representative of the desired building temperature.

15 Claims, 5 Drawing Figures

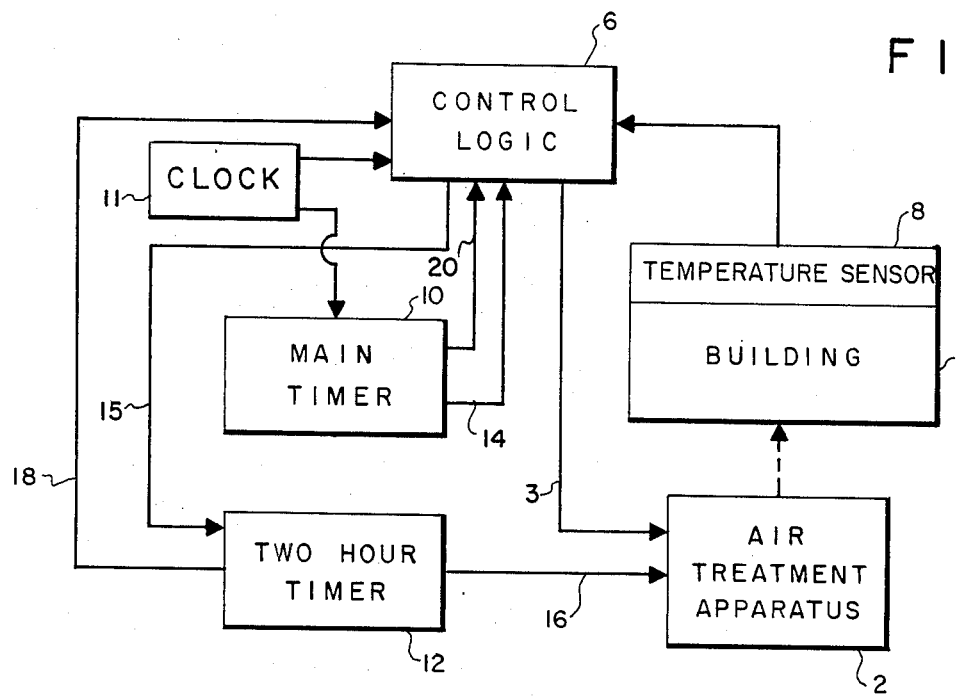
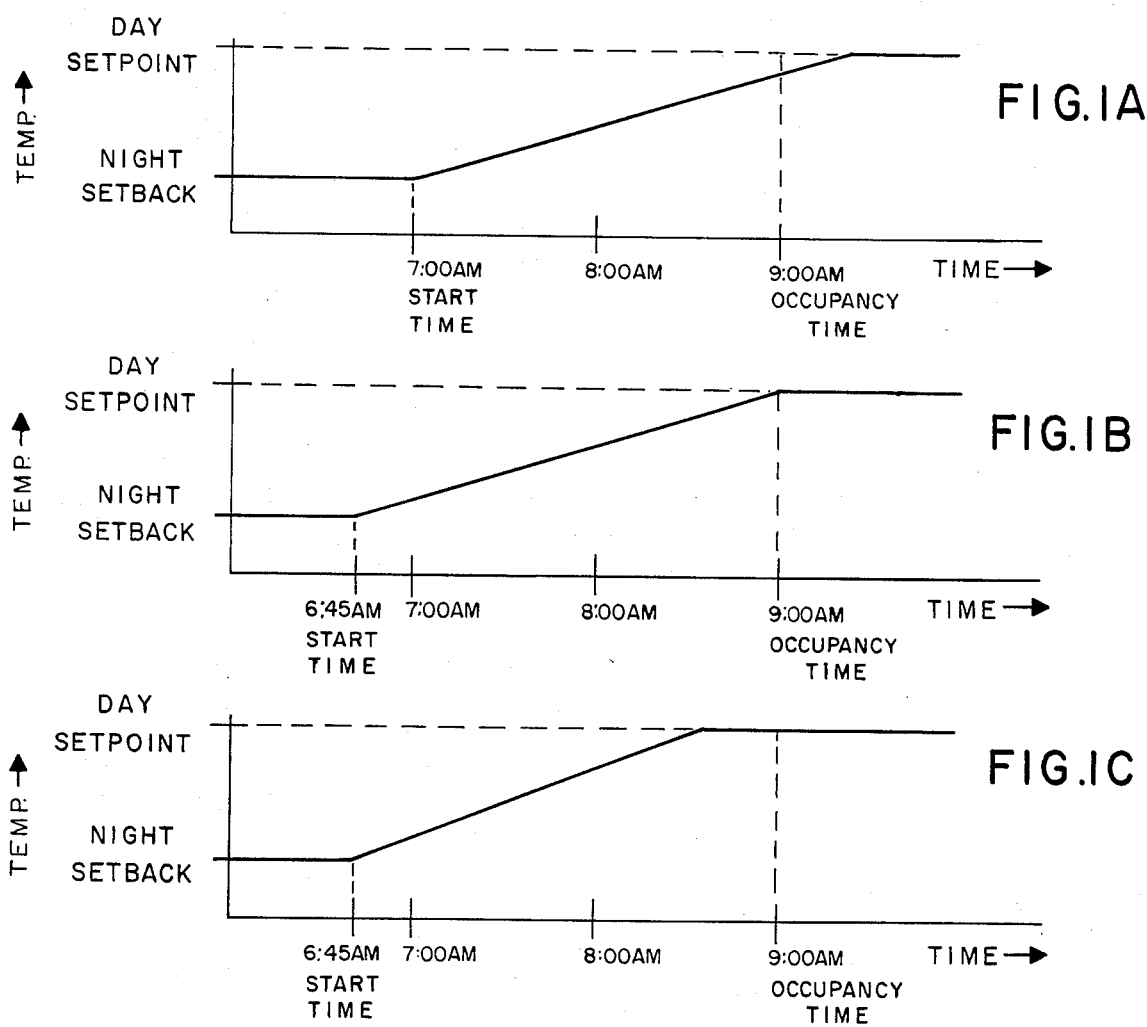

ADAPTIVE CONTROL SYSTEM

BACKGROUND OF THE INVENTION

The present invention relates to a control system for environment treatment within a building. More specifically, the present invention is directed to a building control system which is adaptive whereby the starting of the environment treatment is adjustable and is based on the attainment of a predetermined setpoint condition.

DESCRIPTION OF THE PRIOR ART

Present building internal environment control systems, whether for large buildings or small buildings, are primarily concerned with conserving energy to minimize the cost of operating the building. It is the primary objective of these control systems to reduce the energy consumption of a building to the lowest possible level. One of the most important energy conserving practices today is the setback of the indoor temperature of a building during non-occupancy hours. An energy saving thermostat for use in such a setback operation is shown in U.S. Pat. Nos. 4,316,577 and 4,401,262 and marketed by the assignee of the present application as the T8100A Chronotherm Fuel Saver Thermostat. During the winter months, this setback practice involves lowering the setpoint of the indoor temperature during periods of non-occupancy so that the heating system will not run as much during periods of non-occupancy and, therefore, will require less energy consumption. Conversely, during summer months, setback operation involves raising the indoor temperature setpoint during non-occupancy periods so that the air conditioning system is not required to run as much during non-occupancy hours and, therefore, requires less energy consumption than is required during occupancy hours. In order for the building to be comfortable in the beginning of the occupancy period, previous control systems have attempted to provide an adaptive, i.e., self-adjusting, operation to determine at what time the air treatment system, whether it is an air heating furnace or an air conditioning system, must be turned on prior to the beginning of occupancy in order to bring the building indoor temperature to the desired occupied setpoint temperature, e.g., the adaptive setback system shown in U.S. Pat. No. 4,335,847. Typically, in such prior adaptive systems the time at which the air treatment system is energized prior to the beginning of occupancy has been determined by the outdoor air temperature. During the winter when the outdoor air temperature is very low, the amount of time required to bring the indoor temperature to the desired setpoint temperature is relatively greater than when the outdoor temperature is high, i.e., the amount of time needed to reach the desired setpoint is inversely proportional to the outdoor temperature.

Conversely, energy can be saved by interrupting the operation of the air treatment equipment for a time prior to the period of non-occupancy so that the inside space temperature drifts to a minimum established comfort level at the time non-occupancy begins and thereafter controlling the air treatment equipment at the non-occupancy setback temperature. Here again, the amount of time prior to the period of non-occupancy that the air treatment equipment can be deenergized is determined as a function historically of outdoor temperature. Although most of the prior art systems wherein the amount of startup time before occupancy and stop time before non-occupancy required to maintain a desired comfort level during occupancy and a setback level during non-occupancy have been based on outdoor temperature, there have been attempts to use building space temperature as a basis for determining the start and stop times. In such a system, the rate of change of the temperature during periods of occupancy and non-occupancy have been measured and used in order to determine optimum start and stop times. However, such systems are not fully adaptive since there are many factors other than outdoor temperature and/or rate of temperature change within the building which may affect optimum start and stop times. Further, since the start time is the more critical factor based on the immediate effect on the occupants during the occupancy period, the attainment of the setpoint temperature prior to the occupancy is a higher priority function of the control system. Accordingly, in order to provide an adaptive start/stop time control system based on the aforesaid priorities, the system should provide an adaptive operation which depends upon the actual experience of reaching the desired occupied setpoint temperature.

SUMMARY OF THE INVENTION

An object of the present invention is to provide an improved adaptive start/stop control system for controlling an environment treatment apparatus.

Another object of the present invention is to provide an improved adaptive control system for controlling an air treatment apparatus at a reduced energy consuming level during periods of non-occupancy of a building and for energizing air treatment apparatus at a variable time before an occupancy time so that the building reaches a desired setpoint temperature at the occupancy time.

In accomplishing this and other objects, there has been provided, in accordance with the present invention an adaptive control system including a sensing means for sensing an environmental variable to produce a first output signal representative of the variable, first timer means for producing a second output signal after a first predetermined period, second timer means responsive to said second output signal and to a timing control signal for producing a control signal at the end of a time period selectable from a second predetermined time period less than said first predetermined time period, environmental variable control means responsive to said control signal for controlling said variable, and setpoint comparator means for comparing said first output signal with a setpoint level at the end of the sum of said first and second time periods to produce said timing control signal to select said selectable time period.

BRIEF DESCRIPTION OF THE DRAWINGS

A better understanding of the present invention may be had when the following description is read in connection with the accompanying drawings in which:

FIGS. 1A, 1B and 1C are time-temperature graphs illustrating respective modes of operation of the start/stop control system of the present invention;

FIG. 2 shows a simplified block diagram of an example of a control system embodying the present invention and FIG. 3 is a schematic representation of an example of a circuit suitable for the control system shown in FIG. 2.

DESCRIPTION OF THE PREFERRED EMBODIMENT

Detailed Description

Figure 3:
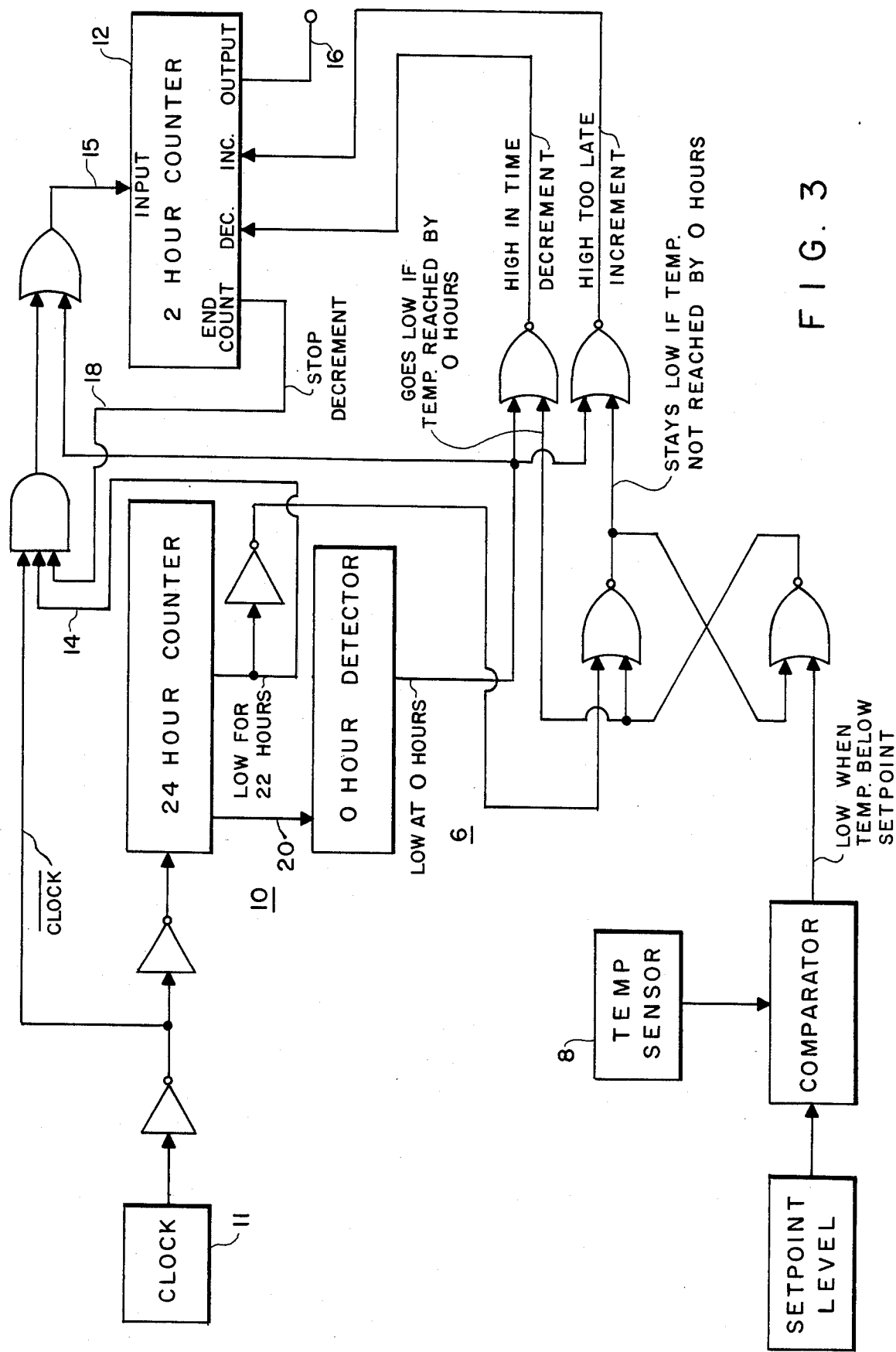

As shown in the graphs in FIGS. 1A, 1B and 1C, the control system of the present invention controls an air treatment apparatus with respect to real time by bringing the air treatment apparatus out of a setback or energy saving condition at a predetermined time to allow the internal temperature of the building to reach the setpoint or desired internal temperature. For example as shown in FIG. 1A, the control system may be programmed to start a heating cycle at a particular preset time prior to the time desired to have the environment within the building at the setpoint temperature, i.e., the occupancy time. For example, the start time may be two hours prior to the desired temperature time. As shown in FIG. 1A, this two hour time period may be insufficient to bring the building temperature to the setpoint temperature at the start of the occupancy time. In such a situation, the air treatment apparatus would then be adjusted by the present invention to start at an earlier time on the next day as shown in FIG. 1B, e.g., an additional fifteen minute earlier start time. Under such an operating condition the air treatment apparatus may be capable of bringing the internal building temperature to the setpoint temperature as shown in FIG. 1B. Conversely, as shown in FIG. 2C, the air treatment apparatus may be capable of bringing the internal building temperature to the setpoint temperature at a time prior to the occupancy time. Such an operation is wasteful of energy since the internal building temperature will be at the setpoint temperature prior to a need for such a condition. Under either the operating cycle shown in FIGS. 1B and 1C, the system of the present invention is arranged to decrement the start time by a predetermined interval, e.g., fifteen minutes, to start the air treatment apparatus at a later time on the next day. Accordingly, the system of the present invention adapts the start of the operation of the air treatment apparatus to the actual operating experience in reaching the setpoint temperature to enable the following air treatment cycle to compensate for whatever factors produced a deviation from the desired setpoint temperature.

As shown in FIG. 2, the control system of the present invention is arranged to control an air treatment apparatus 2 which maintains an internal air temperature of a building 4 at a predetermined level either in setback operating mode or normal operating mode under control of a control logic 6, a temperature sensor 8 and a first time-of-day, or real time, main timer 10. The main timer 10 is arranged to count fixed frequency clock signals from a clock signal source 11 to maintain a count representation of a twenty-four hour time-of-day to enable the air treatment apparatus 2 to be operated at selectable real times by the control logic 6 via control signal line 3, e.g., time of a setback operation. Specific details of the operation of such a basic system may be found in detail in the aforesaid U.S. Pat. No. 4,401,262, which patent is incorporated herein by reference. Since the setback mode of operation is discussed in detail in the aforesaid U.S. Pat. No. 4,401,262, it is believed unnecessary to repeat that portion of the operation of the control system herein and, accordingly, only the portion of the control system of the present invention related to the adaptive startup is shown in FIGS. 2 and 3.

In the control system of the present invention, the basic system shown in the aforesaid patent is modified by the addition, interalia, of a two-hour second timer 12 which is arranged to also count the clock signals from the source 11 and is used to adjust the start time of the air treatment apparatus 2, i.e., to end the setback operation, under control of the first main timer 10 and the control logic 6. Specifically, the first timer 10 is used to produce an output signal when there are two hours remaining in the energy saving setback period, i.e., the end of a twenty-two hour period. This operation of the first timer 10 produces an output signal on output line 14 to the control logic 6 to start the two hour timer 12 that can count the clock signals from the logic 6 via line 15 to effect a count representation of a maximum of two hours. When the second timer 12 reaches a zero count, a control signal applied on output line 16 is arranged to bring the building environment treatment system out of the energy saving setback by starting the air treatment apparatus 2 to enable the building environment to reach the desired setpoint temperature at the preset occupancy time. Further, an end count signal from the second timer 12 via line 18 is arranged to interrupt the clock signals to the second timer 12.

At the end of the count by the first timer 10, i.e., a twenty-four count or zero hour time, the control logic 6 is actuated via line 20 to effect a check as to whether or not the internal building temperature reached the setpoint temperature. If it did not reach the setpoint temperature, the logic circuit 6 will increment the two hour counter 12 by a predetermined period, e.g., fifteen minutes, so that on the next day when the control system is used to start the air treatment apparatus, it will start fifteen minutes earlier. If the internal building environment did reach the setpoint temperature at the zero hour count of the first timer 10, the logic circuit 6 will decrement the two hour timer 12 so that there will be fifteen minutes less time the following day to bring the internal building environment to the setpoint temperature. Thus, the zero hour for determining when the building environment temperature check is to be made is a presetable real time at which it is desired to have the building environment at the setpoint temperature and which represents a twenty-four hour count by the main timer 10. On the other hand, the time within the two hour period following the twenty-two hour count by the main timer 10 at which the air treatment apparatus is brought out of energy saving or setback by the two hour timer 12 is a real time which is adjusted by the temperature check, i.e., a determination of the attainment of the setpoint temperature at the zero hour. Further, while a twenty-four timer and a two hour timer in combination with a fifteen minute incremental adjustment have been specifically presented herein for purposes of illustrating the operation of the present invention, it should be noted that other time period combinations, e.g., a twenty-four hour main timer and a one hour secondary timer with a five minute incremental adjustment, may be used in a specific application without departing from the spirit and scope of the present invention. Thus, as the temperature outside the building 4 and other factors change, the adaptive control system of the present invention will adjust the start time within a time window, needed for the building environment to reach the setpoint temperature.

A detailed schematic of an example of a circuit suitable for the control system of the present invention is shown in FIG. 3 with similar reference numbers being used to correlate FIG. 3 with FIG. 2. The operation of the individual circuits shown in FIG. 3 including OR gates, AND gates, flip-flops, a signal comparator, a temperature sensing bridge circuit, a setpoint level source and a zero hour detector is conventional, and a detailed description of the operation thereof is believed to be unnecessary to provide a full and complete understanding of the present invention. Further, the reset signal lines for the timers 10, 12 and power lines for the circuit components have been omitted for the sake of clarity. On the other hand, the logic signal levels have been identified in FIG. 3 to explain to a person skilled in the art the system operation in incrementing and decrementing the two hour timer 12 to adjust the start up time within each twenty-four hour period. Thus, the circuit shown in FIG. 3 is an example of an actual discrete component implementation of the control system shown in block diagram form in FIG. 2 and discussed in detail above. However, an implementation of the present invention can also be achieved by software stored in a read-only memory (ROM) and used to program a microprocessor which would provide the aforesaid timing and control functions in combination with environmental sensors and setpoint comparators utilizing setpoint information stored in a random-access-memory (RAM) without departing from the spirit and scope of the present invention. Such an implementation would be within the conventional capability of a skilled computer programmer after having had the benefit of the foregoing disclosure of the operation of the present invention.

Accordingly, it may be seen that there has been provided, in accordance with the present invention, an improved adaptive start/stop control system for controlling an environment treatment apparatus.

The embodiments of the present invention in which an exclusive property or privilege is claimed are defined as follows:

1. An adaptive control system comprising
   sensing means for sensing an environmental variable to produce a first output signal representative of the variable,
   a first timer means for producing a second output signal after a first predetermined period,
   second timer means responsive to said second output signal and to a timing control sign for producing a control signal at the end of a time period selectable from a second predetermined time period less than said first predetermined time period,
   environmental variable control means responsive to said control signal for controlling said variable, and
   setpoint comparator means for comparing said first output signal with a setpoint level at the end of the sum of said first and second time periods to produce said timing control signal to select said selectable time period.

2. A control system as set forth in claim 1 wherein said first time period is twenty-two hours and said second time period is two hours.

3. A control system as set forth in claim 1 wherein said selectable time period is selectable in fifteen minute increments from said second time period.

4. A control system as set forth in claim 1 wherein said environmental variable is temperature and said control means controls the temperature.

5. A control system as set forth in claim 1 wherein said first timer means includes a fixed frequency oscillator producing clock signals and a counter for counting said clock signals to produce said second output signal.

6. A control system as set forth in claim 5 wherein said second timer means includes a second counter for counting said clock signals and presettable to an initial count to define said control time period at the end of a count by said second coutner.

7. An adaptive control system for controlling an environment treatment apparatus at a reduced energy consuming level during periods of non-occupancy of a building and for energizing the environment treatment apparatus before a predetermined occupancy time of the building so that the building internal environment is at a setpoint level by the time of occupancy comprising
   sensing means for sensing an environmental variable within the building and for comparing said variable with a setpoint level at the time of occupancy to produce a timing control signal representative of said comparison,
   a first timer means for producing a first output signal after a first predetermined real time period,
   second timer means responsive to said first output signal and to said timing control signal for producing an energy control signal at the end of a control time period selectable from a second predetermined real time period less then said first predetermined real time period, the sum of said first and second predetermined time period, occuring at the start of the time of occupancy, and
   connection means for applying said energy control signal to the environment treatment apparatus to energize said environmental variable at the end of said control time period prior to the occupancy of the building.

8. An adaptive control system as set for in claim 7 wherein said first real time period is twenty-two hours and said second real time period is two hours.

9. An adaptive control system as set forth in claim 8 wherein said control time period is incrementally adjustable by fifteen minute intervals.

10. An adaptive control system as set forth in claim 4 wherein said environmental variable is temperature and treatment apparatus affects the temperature of the air in the building.

11. A control system as set forth in claim 7 wherein said first timer means includes a fixed frequency oscillator producing clock signals, and a first counter for counting said clock signal to define said first real time period.

12. A control system as set forth in claim 11 wherein said second timer means includes a second counter for counting said clock signal and having an initial count selectable by said timing control signal to define said control time period at the end of a count by said second counter.

13. A method for controlling an environment treatment apparatus at a reduced energy consuming level during periods of non-occupancy of a building and for energizing the environment treatment apparatus before a predetermined time of occupancy of the building so that the building internal environment is at a setpoint level by the time of occupancy comprising the steps of
   sensing an environmental variable within the building,
   comparing said variable with a setpoint level at the time of occupancy to produce a timing control signal representative of said comparison,
   utilizing the timing control signal to determine a control time period selectable from a first predetermined real time period which occurs after a second predetermined real time period which is greater than the first predetermined time period, the sum of the first and second predetermined time perods occuring at the start of the occupancy time of the building, producing an energy control signal at the end of the control time period and initiating operation of the treatment apparatus in response to the energy control signal.

14. A method as set forth in claim 13 wherein the second predetermined time period is twenty-two hours and the first predetermined time is tow hour period.

15. A method as set forth in claim 13 wherein the environmental variable is temperature and the treatment apparatus affects the temperature of the air in the building.

* * * * *